United States Patent [19]
Griswold

[11] 3,852,178
[45] Dec. 3, 1974

[54] ELECTROSTATIC FILTERING FOR CLEANING DIELECTRIC FLUIDS

[76] Inventor: Edward A. Griswold, 2072 E. Galbreth Rd., Pasadena, Calif. 91104

[22] Filed: Aug. 27, 1970

[21] Appl. No.: 67,585

Related U.S. Application Data

[60] Division of Ser. No. 538,275, March 29, 1966, Pat. No. 3,544,441, which is a continuation-in-part of Ser. No. 190,457, April 26, 1962, Pat. No. 3,252,885.

[52] U.S. Cl. ................................................ 204/186
[51] Int. Cl. .............................................. B03c 5/00
[58] Field of Search ........................... 204/186–191, 204/302–308

[56] References Cited
UNITED STATES PATENTS

| | | | |
|---|---|---|---|
| 2,116,509 | 5/1938 | Cottrell | 204/300 |
| 2,855,357 | 10/1958 | Stenzel | 204/299 |
| 3,190,827 | 6/1965 | Kok et al. | 204/302 |
| 3,252,885 | 5/1965 | Griswold | 204/302 |
| 3,324,026 | 6/1967 | Waterman et al. | 204/302 |

OTHER PUBLICATIONS

Contact Charging of Micron–Sized Particles in Intense Electric Fields, A.Y.H. Cho., Journal of Applied Physics, Vol. 35, No. 9, Sept. 1964, pgs. 2561–2564.
Electrification by Impact, H. F. Richards, The Physical Review, Vol. XVI, Series II, pg. 290.

*Primary Examiner*—T. M. Tufariello
*Attorney, Agent, or Firm*—William W. Haefliger

[57] ABSTRACT

Method of separating particles suspended in a dielectric field stream by passing the stream through a high voltage unidirectional field in a direction transverse thereto under turbulent flow conditions to effect contact charging of the particles at a charged surface. The fluid stream is then slowed to laminar flow conditions and the charged particles are collected on a stationary structure in a unidirectional field.

23 Claims, 4 Drawing Figures

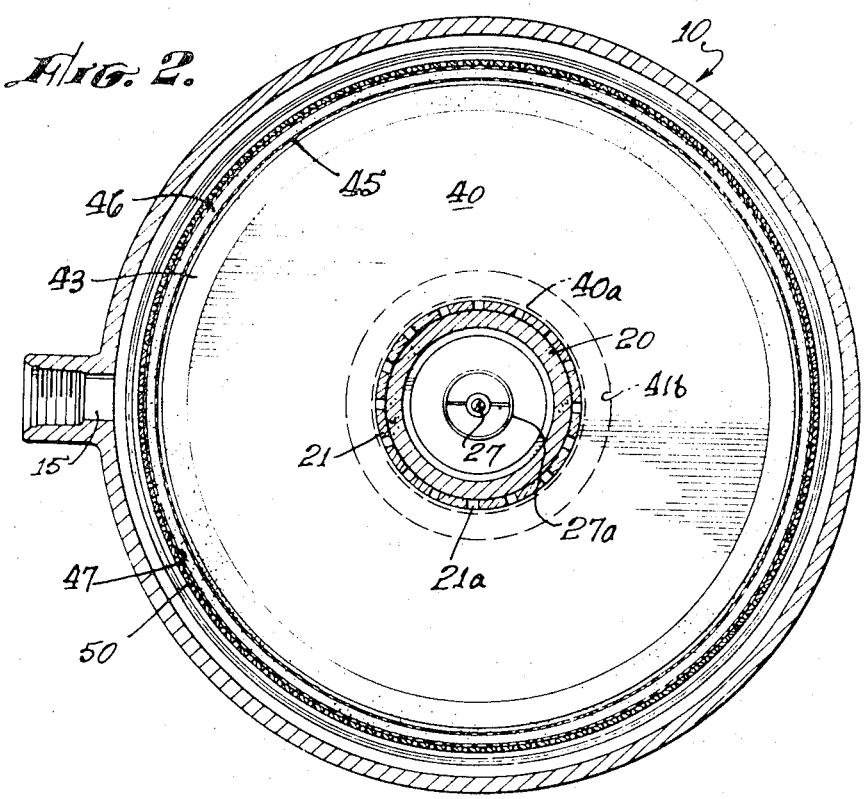
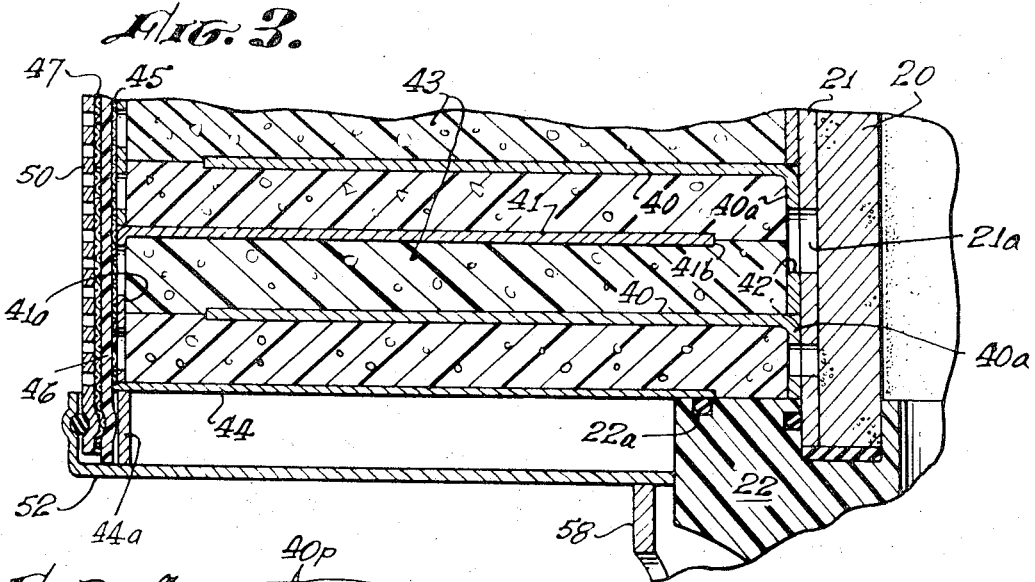

ELECTROSTATIC FILTERING FOR CLEANING DIELECTRIC FLUIDS

This application is a division of Ser. No. 538,275 filed Mar. 29, 1966, now U.S. Pat. No. 3,544,441 is a continuation-in-part of my copending application Ser. No. 190,457, filed Apr. 26, 1962, for FILTER FOR FLUIDS and now U.S. Pat. No. 3,252,885.

The present invention relates generally to a method of filtering fluids; and more especially to a method using both mechanical filters and electrostatic fields to insure removal of all foreign particles suspended in the fluid being cleaned.

The problem of removing very fine particles from a body of fluid is not readily solved by using a mechanical filter alone since it becomes necessary to use a filter element having such very fine pores of openings to pass the fluid that they are easily clogged by removed particles lodging in the pores. The resistance to fluid flow increases rapidly as pores become clogged; and resistance to fluid flow may be intolerably great even without such clogging when the openings are small enough to retain particles of micron size.

It is known, especially in treating dirty gases, that suspended particles can be charged electrically by ions produced from an electrical discharge in the fluid and then caused to migrate and be deposited upon a collecting surface while under the influence of an electric field. A process of this type becomes more difficult and complex, however, for cleaning a liquid when ionizing the fluid by electrical discharge is impractical; and also because the viscous resistance to particle movement under the influence of the electrical field is so great that the liquid must remain in the field for a very long time. An electric filter using electrostatic induction, electrophoresis, and/or electrostatic agglomeration can remove all particulate from either a liquid or gas without destroying any of the fluid or changing any of its chemical or physical properties. In addition, the electric filter has the advantage that the electric field does not impose any restriction on the flow of the fluid through the filter. After such processing, the fluid is biologically sterile, as all the bacteria, spores, and fungi have been removed by the electric filter.

In some situations, for example fuels for missiles, there is a demand for a liquid of greatest possible freedom from contaminants, whether they are solid, liquid or gas. Usually the liquid to be cleaned has a high dielectric value, as in the case with liquid fuels. This is true in general of liquid hydrocarbons substantially free from water, and it is a characteristic that usually makes possible the use of an electrostatic field as a filter means for such a liquid. It has been previously found, however, that fluids having a relatively low dielectric value and electrical resistance can be processed with an electro-filter when the surfaces having the electric potential are coated with material having a high dielectric value and electrical resistance.

Hence it is a general object of the present invention to devise a method of filtering fluids to remove very fine suspended particles and produce a fluid of the highest purity.

It is also an object of the invention to provide a novel method of filtering fluids that combines desirable features of both mechanical and electro-filters.

The present invention is characterized by a method of removing particles from a fluid stream in which they are suspended that includes maintaining between electrodes an electrostatic field through which the fluid stream and the suspended particles are passed with changing velocity. Preferably, the fluid stream is introduced into the field at a high velocity under turbulent flow conditions. The particles may be charged electrically in a separate field or they may be charged inductively or by direct contact with one of the electrodes as a result of the turbulent flow at entry to the field. The fluid velocity is then decreased progressively as the stream passes through the field until laminar flow conditions are reached. A body of a porous material fills the space between the electrodes to disperse the fluid flow and the electrostatically charged particles are deposited on the porous material as well as on the electrodes, often in agglomerated form. Advantageously the fluid stream, still in laminar flow, is then passed through a mechanical filter downstream from the electric field to trap any agglomerates of particles and also to return the fluid to ground electrical potential.

The invention will be better understood by reference to the following description and to the annexed drawing, in which:

FIG. 2 is a transverse section through the filter on line 2—2 of FIG. 1.

FIG. 3 is an enlarged fragmentary median section, as in FIG. 1, of a portion of the filter assembly.

FIG. 4 is a fragmentary perspective of a variational form of plate electrode.

Figure 1:
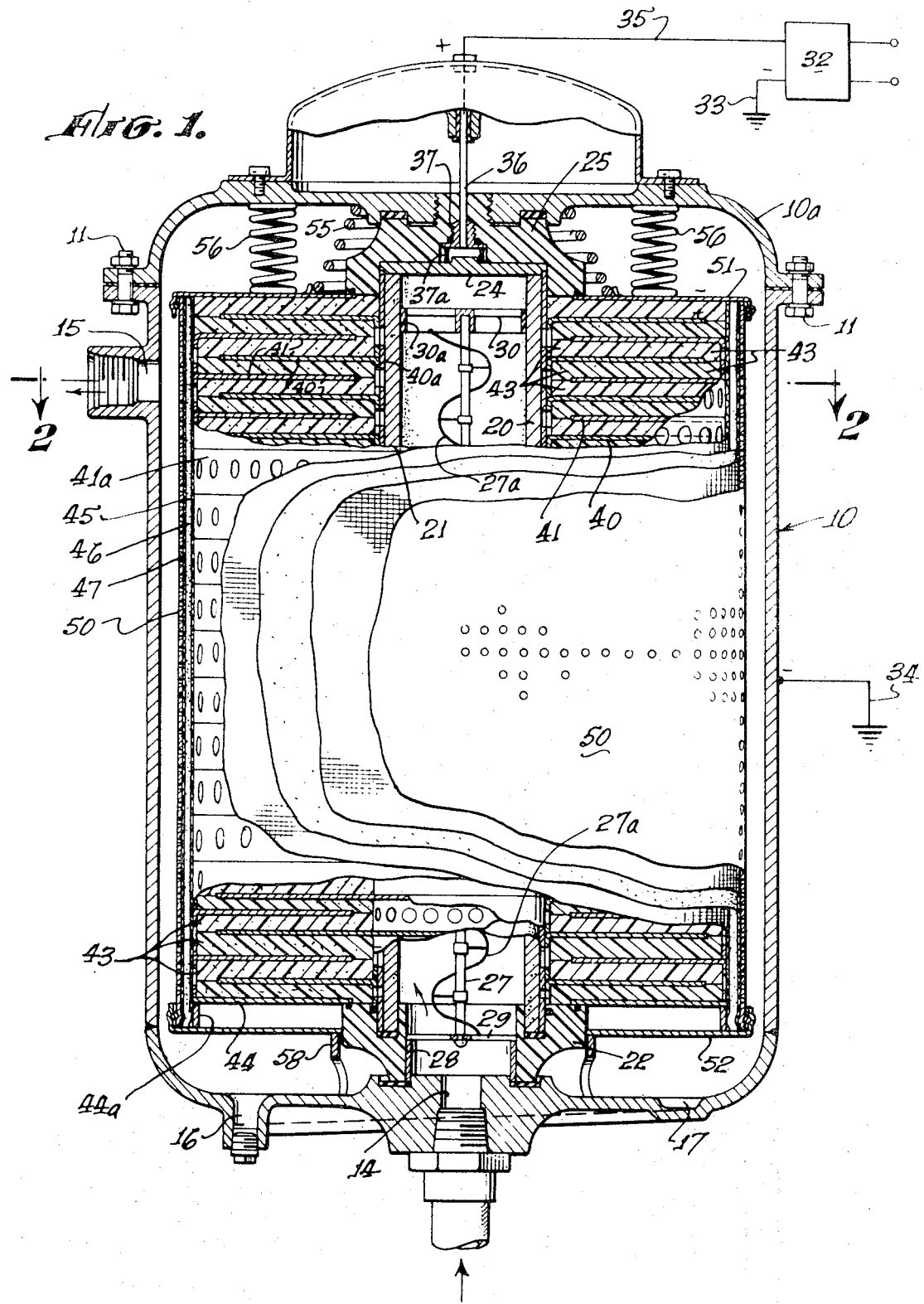
FIG. 1 is a combined partial elevation and longitudinal median section, with successive portions of the interior structure broken away, of a filter suitable for carrying out the present process.

Referring now to the drawing, it will be seen that the liquid filter suitable for performing the method of the present invention includes a tubular shell indicated generally at 10. This shell is usually circular in cross-section and conforms to the general design considerations of a pressure vessel since ordinarily the shell is subjected to fluids under pressures that may run as high as several hundred pounds per square inch. One end of the shell is provided with a removable head section 10a attached to the remainder of the shell by bolts 11 or any other suitable means. When head 10a is removed, access is had to the interior filter element which may be removed as a unit for cleaning, replacement or any necessary maintenance.

Shell 10 is provided with two spaced openings 14 and 15 which may be connected to liquid conduits in any suitable manner. The spaced openings 14 and 15 provide inlet and outlet openings for liquid passing through the filter to be cleaned. Since flow through the filter may be in either direction either one of these openings may be the liquid inlet and the other the liquid outlet.

Because there is often a tendency for a certain amount of sludge or foreign material to collect within the shell, especially when the liquid to be filtered enters through opening 15, it is preferable to provide the shell with a drain as indicated at 16 and an annular gutter 17 or similar means for conducting sediment to the drain opening. Obviously, the drain is preferably located at the lowest point in the shell.

In the preferred embodiment of the invention illustrated in FIG. 1, the shell 10 is illustrated with its longitudinal axis extending vertically and with the fluid inlet assumed to be at opening 14. Accordingly opening 15 is then the outlet. However this specific arrangement is not limitative upon the invention and it will be understood that the filter may be arranged with this longitudinal axis horizontally extending or inclined, as may be desired under circumstances at an installation. This is equally feasible since flow through the filter is created by a differential pressure between the inlet and outlet openings and is not dependent upon gravity, convection current, or the like.

The first filter element encountered by the liquid as it flows from inlet 14 to outlet 15 is a hollow cylindrical filter element 20 located centrally of and extending axially of shell 10. Filter element 20 is a mechanical or porous-element type of filter and may comprise a cylindrical body of a finely porous material such as sintered metal, ceramic, or any other suitable material providing openings of suitably small size. Cylindrical filter element 20 is open at the lower end to receive fluid entering the shell through inlet 14 and is closed at the upper end, thus forcing the liquid to flow radially outward of the filter element through the cylindrical walls thereof. In the event filter element 20 is mechanically weak, it is supported externally by a perforated cylinder 21 which not only radially supports the filter element against the internal liquid pressure but also serves as a structual core member for supporting other filter elements, as will be described. Cylinder 21 is metal to be electrically conductive.

Cylindrical core 20 rests at its lower end on an annular seat in block 22 which is made of any suitable dielectric material in order to insulate the core from the shell. Block 22 is in turn supported centrally of the shell by resting upon the bottom wall thereof. The upper end of core 21 is closed either by an integrally formed end wall or by a separate metal plate 24 which rests upon the upper end of the cylindrical core and is imperforate. On top of plate 24 is insulator block 25 of a suitable solid dielectric material which bears against the inner face of head section 10a of the shell. In this way when the head section is bolted in place and tightened, cylindrical core 20 and sleeve member 21 are held firmly between end blocks 22 and 25; and these members serve as a central supporting column for elements of the filter described later.

Coaxial with filter element 20 and perforated cylinder 21, is the central electrode 27 which is supported at its lower end by collar 28 located within a central bore through the lower dielectric block 22 and provided with a supporting spider 29 to which the lower end of electrode 27 is fastened. The upper end of electrode 27 is positioned centrally with respect to cylinder 21 by spider 30 which is of dielectric material. Spider 30 preferably has a peripheral flange 30a which bears against the inside surface of filter element 20. Electrode 27 may take any one of several known designs that promote the corona discharge at the electrode. A fine wire 27a wound in a spiral around a central supporting rod is illustrated as a typical electrode design. The radius of the spiral is such as to produce the proper electrical clearance between the discharge electrode wire 27a and the opposing electrode comprising sleeve 21 and/or core 20.

Electrode 27 and cylinder 21 are both metal and constitute a pair of opposing electrodes between which is maintained an ionizing or charging field. For this purpose electrode 27 is a discharge electrode and electrode 21 is a non-discharging electrode. If filter 20 is made of sintered metal, it is also conductive and is a part of the non-discharging electrode assembly.

As is well known in the art of electrical precipitation of suspended particles, particularly from gaseous streams, a discharge electrode is one which has a configuration that provides points, corners, edges, or other surfaces of relatively small radius which concentrate the electrostatic field to form localized high-stress zones and so facilitate the production of corona discharge thereat in a gaseous fluid although corona discharge is not produced in a dielectric liquid. On the other hand a non-discharging electrode is one which has flat or extended areas free from portions having a relatively sharp radius and therefore produce a relatively uniform electrostatic field, or which otherwise suppress the tendency to produce corona discharge.

In order to establish high voltage electrostatic field between electrodes 21 and 27, there is provided any suitable type of electrical equipment indicated generally at 32. It may be external to the filter or may be mounted on the filter shell. Such equipment is well known in the art and need not be described in detail here since it constitutes no part of the present invention; but in general such equipment includes a suitable step-up transformer and rectifying means adapted to produce an output of relatively high potential. For this purpose voltage in the range of 10,000 to 14,000 volts is normally sufficient although it will be obvious that the exact voltage used may be varied by the designer to suit the liquid being treated, the inter-electrode spacing, and other factors. One output terminal of the power source 32 is grounded as indicated at 33 while shell 10 is also grounded as indicated at 34. The other output terminal of power source 32 is connected by insulated high tension conductor 35 to a centrally located lead-in 36 which passes through dielectric block 25 and is connected through plug 37 and spring 37a to plate 24 which, being metal, is a conductor and is electrically connected to electrode 21 by contact therewith. It is also connected by contact to filter 20 to energize the latter if conductive. Electrode 21 is insulated from the shell by dielectric blocks 22 and 25 at the two ends of the central core. On the other hand discharge electrode 27 is grounded to the shell through metallic collar 28 and spider 29.

A second filter element inside the shell is located downstream from the first filter element and comprises a plurality of pairs of electrodes of the non-discharging type. These electrodes are provided by pairs of spaced plates 40 and 41 which surround the cylindrical core 21 and extend radially outwardly therefrom. The plates 40 have centrally located flanges 40a having an internal diameter such that they slide easily over but contact the exterior of core 21, as may be seen particularly in FIG. 3. Flanges 40a are perforated as indicated at 42, the perforations being large enough and numerous enough that some of them always align at least in part with the openings 21a in core cylinder 21 in order to allow liquid to flow radially outwardly through filter element 20 then through the surrounding core and the flanges 40a.

As may be seen particularly in FIG. 3, flanges 40a permit the disc electrodes 40 to be stacked on top of each other in contact with and supported by cylindrical core 21 through which electrodes 40 are energized. The flat surfaces of plates 40 are substantially parallel to each other and radial with respect to the filter axis.

Midway between each two plates 40 is a plate or disc 41, plate 40 and plate 41 constituting a pair of oppositely charged electrodes, as will be further explained. Each plate 41 has a peripheral flange 41a which engages the inside face of metallic cylinder 45. Cylinder 45 is here shown as a fine mesh screen; but it will be realized that a perforated sheet metal wall may also be used at this point in place of the screen.

The peripheral flange of the lowermost plate electrode 41 rests upon plate 44 which is supported centrally upon dielectric block 22 and is supported at its periphery by ring 44a which is in turn supported by bottom plate 52. A fluid-tight seal is preferably effected by an O-ring 22a or other means between plate 44 and center block 22 in order to prevent liquid from bypassing the filters. Electrodes 41 above the lowermost one each have their flanges resting upon the plate electrode next below so that each plate electrode, except the top one, supports a plate above it by engagement at the periphery with the superimposed flange. Thus plates 41 are arranged in a stack supported on one another and confined laterally by the surrounding foraminous cylinder 45. Each plate 41 has a central opening 41b larger than the outside diameter of plate flanges 40a, in order to provide adequate electrical clearance between each flange and the surrounding plate 41 at this point. In the same way the diameter of plates 40 is less than the diameter of the surrounding flanges 41a by a distance sufficient to give adequate electrical clearance between these plates and the flanges.

While it is of course possible to support plate electrodes 40 in any other suitable fashion, it is convenient to support them upon the cylindrical core 21 because the contact thus afforded between the plate flanges and the core, in addition to giving physical support to the plates, effects an electrical connection between the plate electrodes and the core itself. Thus plates 40 are maintained at a relatively elevated potential while plates 41 are grounded through other parts of the supporting structure since they are electrically connected to shell 10.

Between each pair of plates 40 and 41 is a body 43 of a porous dielectric material. Suitable for this purpose is a polyurethane foam of the open cell type. Each body 43 of porous dielectric material serves several purposes. It not only helps support the plate electrodes to maintain the proper spacing between them but also acts as a diffuser which slows down the rate of liquid flow between two parallel plate electrodes. This gives a longer time for the electrostatic field maintained between a pair of plates to exert an influence on the suspended particles and gives them an opportunity to migrate to one of the plate electrodes. In addition, a third function of the porous dielectric material is to serve as a filter. A certain amount of filter action is a natural consequence of the passage of the liquid through the body of porous dielectric material; but for reasons that will be further apparent the mechanical filtering action is more or less incidental.

A third filter element is provided downstream from the second filter means provided by the parallel plate electrodes. This third filter element comprises a sheet 46 of a suitable porous material around the screen cylinder 45. This filter element 46 is likewise cylindrical in configuration and is in contact with the outer surface of cylinder 45. Outwardly of the filter element 46, there is preferably placed a wire mesh screen 47 in contact with the filter element 46. This cylindrical screen 47 is a relatively coarse screen, considering the size of the particles involved, and is designed to retain only particles of a diameter of 50 microns or larger. Thus it passes anything under about 50 micron size. This size of particle is chosen arbitrarily for illustrative purposes and it will be realized that the mesh size of the screen may be selected to pass larger or smaller particles.

Outside of the screen 47 is an outer cylinder 50 designed as a structural member to retain the inner elements in place and support them physically against the interior pressures against them developed by the liquid moving through the filter elements.

Outer cylinder 50 is connected to and carries top and bottom plates 51 and 52 respectively which have axially turned rims by which the plates are connected to the cylinder in any suitable manner. In this way all the filter elements are maintained together in the proper relative positions as a unitary assembly which can be inserted into shell 10 or removed therefrom as a unit when the head section 10a is unbolted and removed.

As a means of obtaining axial pressure on the assembly of plates and filter elements to prevent relative movement, and also as a means of providing an electrical connection between the shell and certain of the filter elements, springs 55 and 56 are interposed between the top plate 51 of the assembly and the inside face of end section 10a of the shell. These springs provide a yielding force on the filter assembly pushing it against support ring 58 at the base. Ring 58 supports the filter assembly at a position adjacent lower insulator block 22.

Construction of a preferred embodiment of my filter having been described, the operation of it will now be described briefly. The stream of liquid from which suspended particles are to be removed is introduced into the shell 10 at inlet opening 14. The fluid stream enters directly the interior space of the cylindrical filter element 20 in which space the fluid stream is subjected to the particle charging-action of the high intensity charging field maintained between wire electrode 27 and non-discharging cylindrical electrode 21. In this field, the suspended particles become electrically charged as they flow through the space within the cylinder and then outwardly through filter element 20.

The liquid stream flows outwardly from cylinder 21 through the openings 21a therein and the alined openings 42 in the flanges of plates 40. The fluid stream can now flow in a radial direction at a changing velocity parallel to and between the surfaces of the electrode pairs 40 and 41. In this space the liquid stream is subject to the action of the non-discharging electrostatic field maintained between two successive plate-type electrodes. This electric field is substantially uniform because the electrodes are parallel and it causes the charged particles to migrate to one of the electrodes. The electrode on which they collect will be the one of opposite polarity to the electrode 27 which, in the arrangement illustrated is electrode system comprised of plates 40. For this purpose, electrode 27 may be either positive or negative as desired.

Any relatively coarse particles that pass through the first filter means into the second filter means will be retained by the filter action of the porous dielectric body 47, while finer particles migrate under the influence of the electrostatic field through the open cells of the porous bodies 43 to the surface of one of the plate electrodes. The open cell structure of the porous dielectric 43 causes the liquid to flow slowly over a devious path thereby keeping the liquid subject to the electric field for a longer period of time than is otherwise possible.

In filtering hydrocarbon fuels and petroleum products in general, it has been found that the contaminates are generally of a gummy or sticky nature and as a consequence when they once are deposited upon one of the collecting electrodes 40 or 41 they tend to adhere to the surface of that electrode. However, should an agglomerated mass of such particles break loose or be eroded from the electrode for any reason and pass through the body of porous dielectric, such resuspended particles, being relatively large, are removed from the fluid stream by passing the stream through a downstream filter means consisting of the porous body 46 and the fine mesh screen 45. The openings in filter 46 are smaller than the pores in dielectric 43.

After passing through the third filter means, the liquid stream flows longitudinally of the annular area inside the shell and around cylinder 50 to be exhausted from the shell through outlet opening 15.

Flow from inside the filter assembly outwardly to the periphery is preferred, especially in the case of fluids having a relatively low density of particles to be removed and particularly when the particles are relatively fine. The action of the electrostatic field in removing the particles from suspension is then particularly marked because the particles are first charged in the central core and as the fluid stream moves away from the core the velocity of flow progressively and continually decreases as the fluid moves through a passage of progressively increasing cross-section radially outward toward the shell wall, allowing a longer exposure to the electric field than in a passage uniformly of only the initial cross-sectional area.

The fluid is preferably introduced into the uniform field between a pair of parallel electrodes at a sufficiently high velocity that flow is turbulent. The small area of each of openings 21a and 42 insures this high velocity at entrance. Turbulent flow brings many of the particles quickly into close proximity to one electrode. If the particles are charged already, they are quickly deposited on the electrode if it is of a polarity opposite to the particles.

On the other hand, if any particles are not previously charged they become charged, either by taking on an induced charge or by direct contact with the electrode. The particles, now charged, are than attracted to the electrode of opposite polarity, even though the fluid stream does not pass through the initial charging field.

The expanding cross-sectional area between two electrodes 41 and 43 reduces the fluid velocity to the point when flow is laminar and is preferably low enough not to erode any particles from the surface of the electrodes or from the porous dielectric. Typically, velocity at exit from the field is reduced to about one to two inches per second, more or less, the exact value depending upon viscosity of the liquid, particle concentration, and other physical factors; but a value of less than one inch per second is preferred. The low fluid velocity avoids re-entrainment of particles by erosion or by dissociation of agglomerates.

However, in the event that it is desired to filter a relatively dirty liquid, that is one in which the particle concentration is relatively high, it may be found advantageous to reverse the direction of flow. This is done by introducing the fluid stream through the opening 15 which then becomes the inlet. Several abrupt changes in direction and velocity are imposed on the fluid stream to assist in deposition of suspended particles through the opening 15 which becomes the inlet. The flow is then from the outside of the filter assembly radially inward to the center in the reverse direction of that already described and the velocity of the fluid stream increases as it flows through the electrostatic field. The relatively large surface area around the periphery of filter elements 46 and 47 is thus used to advantage because the relatively high initial concentration of suspended material is then collected over a larger cross-sectional area so that the useful life of the porous filter is extended. Under these circumstances, the third filter means, in direction of flow, becomes the filter element 20 and it serves as a final barrier to any relatively large particles which are not removed from suspension or have been eroded off the electrodes by the time the liquid stream reaches this filter element.

With the reverse direction of flow last described, the central charging field established between electrodes 21 and 27 becomes of little effect, because the fluid is largely cleaned by the time it reaches this field. Under these circumstances, it may be found suitable to omit the discharge electrode 27. It is possible instead to establish a charging field between each pair of plate electrodes 40 and 41 by providing all such electrodes of one polarity with sharp points or edges to create surface configurations that concentrate the fluid locally into high-stream zones. This can be done easily by piercing the plates 40 with a sharp tool to form ragged projections 40p at one or preferably both sides of the plate as shown in FIG. 4. The result is a surface resembling the familiar kitchen grater. This electrode construction establishes a charging field, or a plurality of localized charging fields between each pair of plate electrodes 40 and 41 while still subjecting the particles to the force of the field for a long enough time that the particles migrate to and are deposited on one of the electrodes.

Also it produces an hydraulic cross-section that is greater than the cross-section of the electric field, so that the hydraulic velocity is reduced without affecting the intensity of the field.

It has been found by experience when filtering hydrocarbons having a high resistivity that the suspended particles are often precharged electrically to a degree sufficient that they may be removed in an electrostatic field without the need of first being passed through a charging field. It is possible for particles to acquire an electric charge in many different ways since it is known that ionization occurs as a result of heat, friction, and other causes. If the fluid being filtered has come in contact with charged elements of an electric system, the suspended particles may have acquired a charge either by direct contact or by induction. The high dielectric nature of the liquid carrier prevents these particles from losing their charges. Consequently there are situations in which the suspended particles carry a sufficient electric charge at the time of entry into the filter that no discharging field is required in order to electrically charge the particles. The presence of precharged particles is especially favorable to reverse flow through the filter, that is flow in the direction from the periphery inwardly to the core.

The filter illustrated herein is particularly designed for performance of the improved filtration of liquids; but in a broad sense, the invention is independent of the specific filter apparatus and may be performed in a variety of suitable structures. Accordingly it is to be understood that disclosure of a particular apparatus is not intended to be limitative upon the invention, as other structures may be used equally well. Likewise, various modifications on the method may be made within the scope of the appended claims.

I claim:

1. The method of separating particles suspended in a dielectric fluid stream that includes the steps of:
   maintaining a substantially uniform, high voltage unidirectional electric field,
   flowing the fluid stream through the electric field in a direction generally transversely to the field;
   directly impacting the particles onto a surface by flowing the fluid stream at a sufficiently high velocity under turbulent flow conditions to effect contact charging of the particles at the surface followed by separation of the charged particles from said surface; and
   collecting the charged and separated particles on stationary structure in a unidirectional electric field.

2. The method of claim 1 wherein said stationary structure is porous, and said collecting step is carried out to collect the particles interiorly of said structure.

3. The method of claim 1 wherein said stream flow before particle impacting is turbulent, and including the step of altering the flow subsequent to said particle impacting to produce laminar stream flow prior to said collecting step.

4. The method of claim 2 wherein said stream flow before particle impacting is turbulent, and including the step of altering the flow subsequent to said particle impacting to produce laminar.

5. The method of separating particles suspended in a dielectric fluid stream that includes the steps of:
   maintaining a substantially uniform, unidirectional electric field,
   flowing the fluid stream through the electric field in a direction generally transversely to the field;
   directly impacting the particles onto a surface in the field by introducing the fluid stream into said electric field at a sufficiently high velocity to create turbulent flow conditions within said field thereby to effect contact charging of the particles at said surface followed by separation of the particles from said surface; and
   collecting the charged particles on stationary structure in a unidirectional electric field.

6. The method of separating solid particles suspended in a dielectric fluid stream, that includes
   a. flowing the fluid stream through a substantially uniform electric field,
   b. directly contacting the particles in the flowing stream under turbulent flow conditions onto a surface in the field to effect contact electrical charging of the particles followed by separation of the particles from said surface and displacement of the charged particles by said stream, and
   c. collecting the charged and separated particles on stationary structure in an electrical field and spaced from said surface.

7. The method of claim 6 wherein said direct contacting is effected by impacting the particles against said surface.

8. The method of claim 7 wherein said impacting is effected by creating stream turbulent flow forcibly displacing the particles onto said surface and thereafter displacing the charged particles away from said surface toward said stationary structure.

9. The method of claim 8 including the step of confining said turbulent flow to a zone between generally parallel planar boundaries, and directing said field through said zone generally normal to said boundaries.

10. The method of removing particles suspended in a stream of a dielectric fluid in a porous region laterally bounded by spaced electrodes that includes the steps of:
    flowing the stream of fluid with particles suspended therein along a path within said porous region;
    maintaining a high-intensity unidirectional electrostatic field across the fluid path between the laterally spaced electrodes;
    directly contacting the particles in the flowing stream under turbulent flow conditions onto a surface to effect contact electrical charging of the particles followed by separation of the particles from said surface and displacement of the charged particles by said stream,
    effecting a change in velocity of the fluid stream by controlling the net cross-sectional area of the porous region available to the fluid stream in said field wherein the particles migrate toward a boundary of the region; and
    receiving the migrating particles on stationary structure defining the porous region.

11. The method of claim 10 including the step of initially flowing the stream within a zone from which the stream flows to said porous region, and maintaining a high-intensity charging field in said zone to precharge the particles in the stream flowing therein.

12. The method of claim 11 including the step of mechanically separating particles from the stream subsequent to flow thereof in said zone and prior to flow thereof in said region.

13. The method of claim 11 wherein a plurality of said bounded regions are formed to pass the stream therethrough from said zone with each region passing a portion of the stream and said portions passing through the regions in generally parallel relation, sand the maintenance of the electrostatic field being carried out to direct the field oppositely in successive regions.

14. The method of claim 10 in which the stream velocity is reduced as it flows along the path through the field by increasing the net cross-sectional area of the porous region in the direction of fluid stream flow.

15. The method of claim 10 wherein said change of velocity of the stream is effected by restricting the flow entering said region to produce turbulence thereof, and thereafter diffusing the stream flow through porous dielectric media operating to reduce the flow velocity to establish laminar flow in said region.

16. The method of claim 15 wherein particles migrating to said boundary tend to form agglomerates carried by the flow out of the porous region, and including the step of mechanically separating agglomerates from the stream at the low velocity of fluid flow proximate the downstream boundary of said porous dielectric media.

17. The method of removing particles suspended in a dielectric fluid stream that includes the steps of:

flowing the stream along a generally longitudinal path within an open laterally bounded zone totally bridged by said fluid stream and totally laterally enveloped by a depth type porous medium;

maintaining a high-intensity unidirectional charging field directed generally radially in said zone and extending to a porous outer lateral boundary thereof, directly contacting the particles in the flowing stream under turbulent flow conditions onto a surface in the field to effect contact electrical charging of the particles followed by separation of the particles from said surface and displacement of the charged particles by said stream; and receiving the charged particles at and within said porous boundary.

18. The method of claim 17 including the step of effecting progressively along said longitudinal path a lateral flow of the stream to and through said porous lateral boundary.

19. The method of claim 18 including the step of mechanically separating particles from the stream proximate said porous lateral boundary.

20. The method of claim 18 wherein said lateral flow of the stream carries certain particles through said porous boundary, and including the steps of subsequently flowing the stream away from said zone within a laterally bounded, porous dielectric region, maintaining a high-intensity electrostatic field directed generally transversely to the direction of fluid flow in said region and extending to a boundary thereof to cause migration of the particles toward and to said lateral boundary, and collecting the migrating particles within said region.

21. The method of claim 20 including the step of reducing the stream flow velocity by increasing the cross-sectional area of said region available to the fluid stream.

22. The method of claim 21 including the step of mechanically separating particles from the flow proximate to flow passage through the said porous dielectric region.

23. The method of removing particles suspended in a stream of a dielectric fluid in a porous region laterally bounded by spaced electrodes, that includes the steps of:

flowing the stream of fluid with particles suspended therein along a path within said porous region;

establishing a plurality of localized charging fields between the spaced electrodes bounding the stream path at said porous region and wherein the suspended particles are charged;

maintaining a high-intensity unidirectional electrostatic field across the fluid path between the laterally spaced electrodes;

directly contacting the particles in the flowing stream under turbulent flow conditions onto a surface in the field to effect contact electrical charging of the particles followed by separation of the particles from said surface and displacement of the charged particles by said stream;

effecting a change in velocity of the fluid stream by controlling the net cross-sectional area of the porous region available to the fluid stream in said field wherein the suspended particles migrate toward a boundary of the region; and receiving the migrating particles on stationary structure defining the porous region.

* * * * *